US007925650B2

(12) United States Patent
Obrador et al.

(10) Patent No.: US 7,925,650 B2
(45) Date of Patent: Apr. 12, 2011

(54) IMAGE MANAGEMENT METHODS, IMAGE MANAGEMENT SYSTEMS, AND ARTICLES OF MANUFACTURE

(75) Inventors: Pere Obrador, Mountain View, CA (US); Nathan M. Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1293 days.

(21) Appl. No.: 11/495,847

(22) Filed: Jul. 27, 2006

(65) Prior Publication Data

US 2008/0025647 A1 Jan. 31, 2008

(51) Int. Cl.
*G06F 7/00* (2006.01)
(52) U.S. Cl. .................. 707/723; 382/162; 382/305
(58) Field of Classification Search .................. None
See application file for complete search history.

(56) References Cited

U.S. PATENT DOCUMENTS

| | | | |
|---|---|---|---|
| 5,493,677 A * | 2/1996 | Balogh et al. ............... | 1/1 |
| 6,741,800 B2 | 5/2004 | Ko et al. | |
| 6,792,141 B2 | 9/2004 | Huniu | |
| 7,546,524 B1 * | 6/2009 | Bryar et al. ................. | 715/230 |
| 2001/0017940 A1 * | 8/2001 | Kim et al. ................... | 382/162 |
| 2003/0195883 A1 * | 10/2003 | Mojsilovic et al. .......... | 707/6 |
| 2004/0049734 A1 * | 3/2004 | Simske ....................... | 715/512 |
| 2005/0052665 A1 | 3/2005 | Moroney | |

OTHER PUBLICATIONS

Mehtre B M et al.: "Color matching for image retrieval" Pattern Recognition Letters, North-Holland Publ. Amsterdam, NL vol. 16, No. 3 Mar. 1995, pp. 325-331.

Aslandogan Y A et al.: "Techniques and systems for image and video retrival" IEEE Trans. on Knowledge and Data Eng., vol. 11, No. 1 Jan. 1999 pp. 56-63.
"Unconstrained web-based color naming experiment"; Moroney, Nathan; Color imaing: Device-Independent Color, Color Hardcopy, and Graphic Arts VIII; proc. of SPIE; 2003; 11 pp.
"Mathematical morphology for angle-valued images"; Peters, II, Richard; Proc. of the SPIE, Non-Linear Image Processing VIII; vol. 3026; 1997; pp. 84-94.
"Multiresolution Color Patch Extraction"; Obrador, Pere; SPIE Visual Communications and Image Processing; Jan. 15-19, 2006; 12 pp.
U.S. Appl. No. 11/259,597, filed Oct. 25, 2005; entitled "An Adaptive Lexical Classification System"; Moroney, Nathan.
"Image Processing Methods, Image Management Systems, and Articles of Manufacture"; Obrador et al.; filed same day.

* cited by examiner

*Primary Examiner* — Charles Rones
*Assistant Examiner* — Dinku W Gebresenbet

(57) ABSTRACT

Image management methods, image management systems, and articles of manufacture are described. According to one embodiment, an image management method includes storing a plurality of images using storage circuitry, storing a plurality of representations for respective ones of the images, and the representations comprise data corresponding to a plurality of human comprehensible words of a human readable lexicon and descriptive of respective characteristics of content of the images, associating respective ones of the representations with respective ones of the respective one of the images, accessing search criteria, comparing the search criteria with the representations, identifying a selected one of the images responsive to the comparing, and accessing the selected one of the images from the storage circuitry responsive to the identifying.

15 Claims, 4 Drawing Sheets

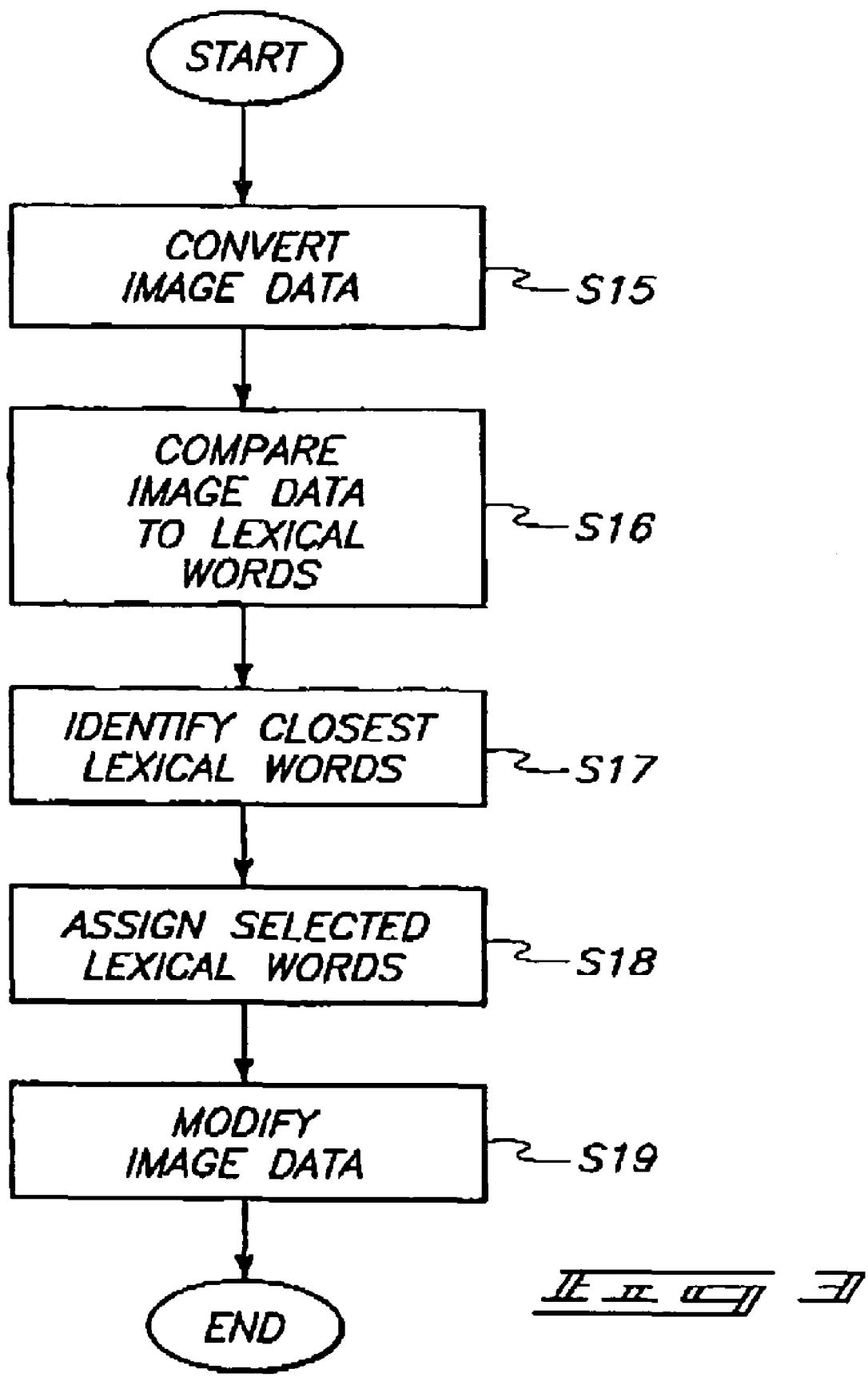

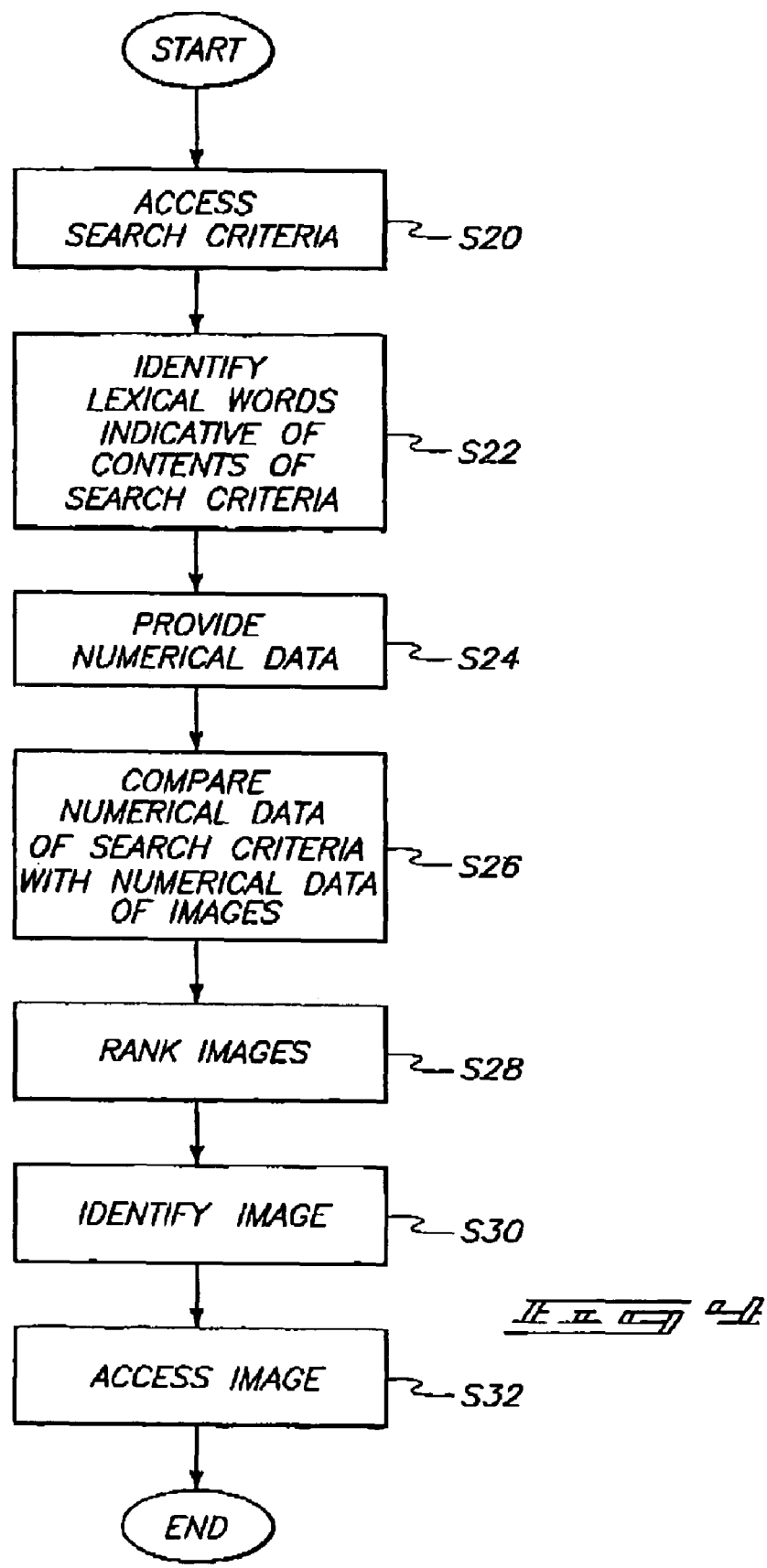

IMAGE MANAGEMENT METHODS, IMAGE MANAGEMENT SYSTEMS, AND ARTICLES OF MANUFACTURE

FIELD OF THE DISCLOSURE

Aspects of the disclosure relate to image management methods, image management systems, and articles of manufacture.

BACKGROUND OF THE DISCLOSURE

Colors are visual attributes resulting from responses to light waves of different frequencies impinging upon the human eye. The perception of color results from the combined output of three sets of retinal cones having peak sensitivities in the red, green and blue portions of the electromagnetic spectrum. Different levels of stimulus to the different sets of retinal cones gives rise to the ability of humans to perceive a large range of colors.

Conventional approaches to describing colors have included systems based on color encodings which represent components of a color in terms of positions or coordinates in a multidimensional color space. Colors may be mathematically represented using numerical data indicative of the position or coordinates in the color space. Although data regarding a color may specifically define a color with respect to the color space, these representations typically do not intuitively covey information regarding the color to humans.

At least some aspects of the disclosure provide methods and apparatus for performing operations with respect to images using words of a human readable lexicon and which are descriptive in human understandable terms of characteristics, such as color, of the images.

SUMMARY

According to some aspects of the disclosure, image management methods, image management systems, and articles of manufacture are described.

According to one aspect, an image management method comprises storing a plurality of images using storage circuitry, storing a plurality of representations for respective ones of the images, and the representations comprise data corresponding to a plurality of human comprehensible words of a human readable lexicon and descriptive of respective characteristics of content of the respective one of the images, associating respective ones of the representations with respective ones of the images, accessing search criteria, comparing the search criteria with the representations, identifying a selected one of the images responsive to the comparing, and accessing the selected one of the images from the storage circuitry responsive to the identifying.

According to another aspect, an image management system comprises storage circuitry configured to store a plurality of images and to store a plurality of representations corresponding to human comprehensible words of a human readable lexicon and associated with respective ones of the images, wherein the words are descriptive of characteristics of content of the images and the respective representations are indicative of the extents of the respective characteristics present in respective ones of the images, and processing circuitry coupled with the storage circuitry and configured to identify one of the images from an other of the images using the representations associated with the one and the other of the images.

According to still another aspect, an article of manufacture comprises media comprising programming configured to cause processing circuitry to perform processing comprising accessing search criteria usable to identify an image having at least one desired color, searching numerical data of a plurality of stored images using the search criteria, wherein the numerical data for one of the stored images comprises a plurality of values for a plurality of colors corresponding to a plurality of lexical color names of a human readable lexicon, and wherein the values are indicative of quantities of the respective colors present in respective one of the stored images, and responsive to the searching, selecting at least one of the stored images having the at least one desired color.

Other embodiments and aspects are described as is apparent from the following discussion.

DESCRIPTION OF THE DRAWINGS

FIG. 3 is a flow chart of an exemplary method of processing image data, including lexically quantizing the image data, according to one embodiment.

FIG. 4 is a flow chart of an exemplary method of identifying and accessing images according to one embodiment.

DETAILED DESCRIPTION

Digital imaging devices have experienced wide acceptance and popularity. Usage of imaging devices over time may result in the creation of numerous images and associated digital data. Management of images, storage of images and accessing previously stored images may be increasingly time consuming to users as the numbers of images created and stored increases over time. At least some aspects of the disclosure provide methods and apparatus useful for management of digital images, such as still images or video images. According to some more specific aspects, methods and apparatus are disclosed which utilize lexical quantization of images to assist users with management of images. The user is directed to exemplary lexical quantization teachings discussed in a co-pending U.S. Patent Application entitled "An Adaptive Lexical Classification System", having U.S. patent application Ser. No. 11/259,597, filed Oct. 25, 2005, naming Nathan M. Moroney as inventor, (the "'597 application") and the teachings of which are incorporated herein by reference. In more specific illustrative embodiments described below, lexical naming representations (e.g., histograms or vectors) indicative of content of the images may be used for indexing and retrieval of images including photographs or frames of video image content. Additional exemplary details regarding management of images according to other embodiments are discussed in a co-pending U.S. Patent Application entitled "Image Processing Methods, Image Management Systems, and Articles of Manufacture", filed the same day as the present application, naming Pere Obrador and Nathan M. Moroney as inventors, and the teachings of which are incorporated herein by reference.

Figure 1:
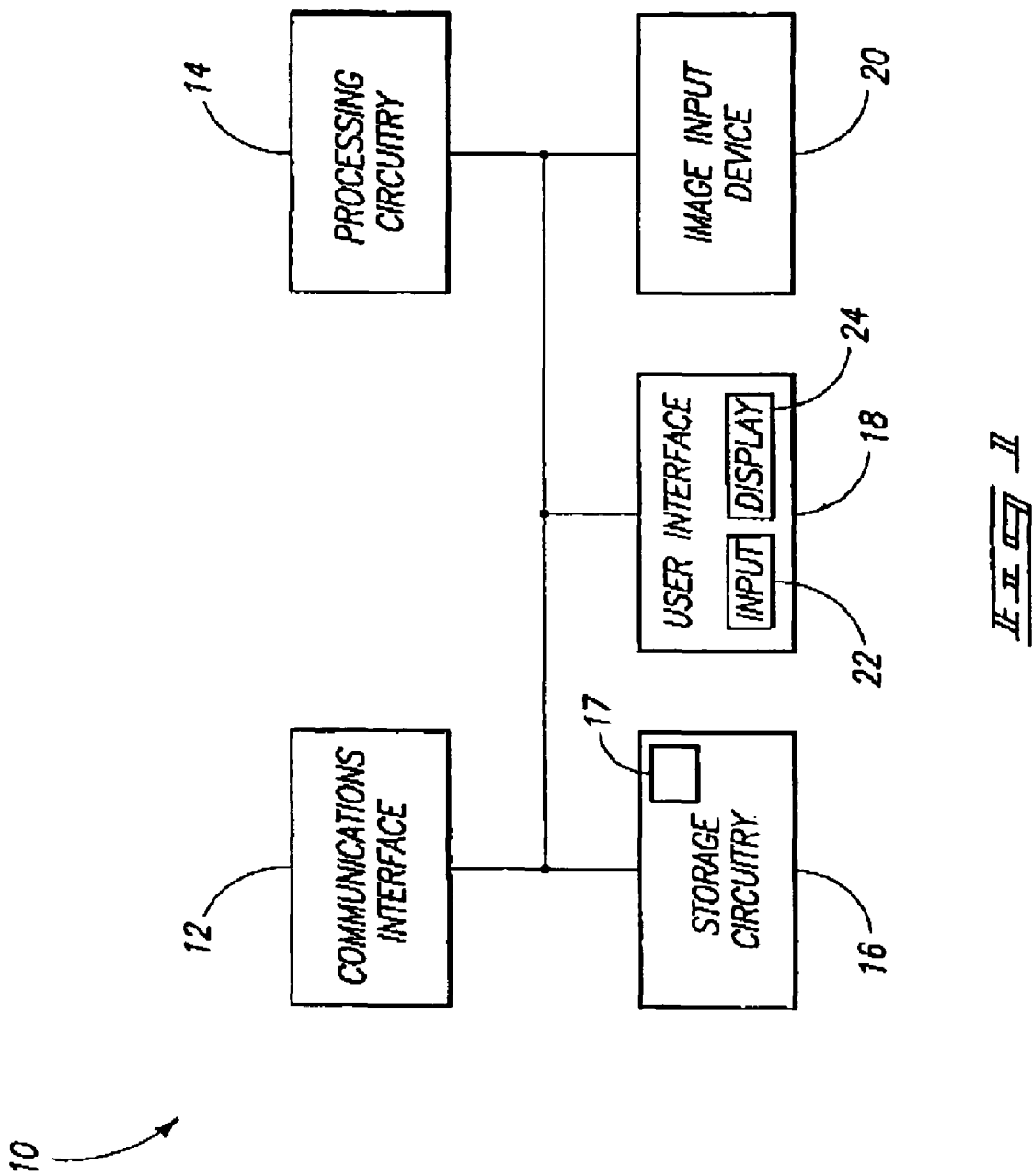
FIG. 1 is a functional block diagram of an image management system according to one embodiment.

Referring to FIG. 1, an exemplary image management system 10 is depicted according to one embodiment. The illustrated image management system 10 includes a communications interface 12, processing circuitry 14, storage circuitry 16, a user interface 18 and a scanning device 20 according to the depicted embodiment. Other arrangements of system 10 are possible including more, less and/or alternative components.

Communications interface 12 is arranged to implement communications of computing device 10 with respect to external devices not shown. For example, communications interface 12 may be arranged to communicate information bi-directionally with respect to computing device 10. Communications interface 12 may be implemented as a network interface card (NIC), serial or parallel connection, USB port, Firewire interface, flash memory interface, floppy disk drive, or any other suitable arrangement for communicating with respect to computing device 10.

In one embodiment, processing circuitry 14 is arranged to process data, control data access and storage, issue commands, and control other desired operations. Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, image data, meta data associated with image data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 16 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry. For example, programming may be provided via appropriate media including, for example, embodied within articles of manufacture 17, embodied within a data signal (e.g., modulated carrier wave, data packets, digital representations, etc.) communicated via an appropriate transmission medium, such as a communication network (e.g., the Internet and/or a private network), wired electrical connection; optical connection and/or electromagnetic energy, for example, via a communications interface, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display 24 (e.g., cathode ray tube, LCD, etc.) configured to depict visual information and as well as a keyboard, mouse and/or other input device 22. Any other suitable apparatus for interacting with a user may also be utilized.

Image input device 20 may be implemented as any suitable device configured to provide digital data corresponding to an image, such as a photograph, provided to system 10. Scanning device 20 may be a flatbed color photograph scanner or digital camera in exemplary implementations.

As mentioned above, lexical quantization may be used to process images as well as to assist with management of images. Lexical quantization uses human comprehensible words of a human readable lexicon (e.g., words of the English language or other languages) to describe visual characteristics of content of an image. The human comprehensible words may be associated with the image data and be used to assist with and/or facilitate management of images. In one exemplary embodiment, the human comprehensible words may describe characteristics (e.g., colors, grey scaling) of contents of the images in natural language, readily understood words to average humans in one embodiment. For example, the human comprehensible words may include lexical color names present within a human readable and comprehensible lexicon (e.g., content readily read and understood by humans as part of human language as distinguished from machine language or code which may also be understood by programmers but typically requires some type of mapping or understanding of mathematical relationships to color). Some exemplary lexical color names readily recognizable to humans and which may be used in one embodiment include white, light gray, gray, dark gray, black, red, yellow, green, blue, purple, pink, sky blue, teal, dark teal, orange, flesh, lime green, navy blue, olive green, brown, salmon, dark green, seafoam, cyan, pale yellow, pale cyan, and pale pink.

As described in the '597 application, lexical color names corresponding to quantization bins may be generated by an aggregation of definitions of a relatively large population of humans. Accordingly, in some embodiments, words describe ranges of frequencies of the electromagnetic visible spectrum and which are readily understood words of the human lexicon as distinguished from technical terms for identifying the electromagnetic energy and perhaps only familiar to technical persons educated with respect to such technical terms in at least one implementation. Words may refer to any meaning bearing sequences of symbols of a lexicon, and may include abbreviations and lemmas as examples.

In one embodiment directed to color, the number of categories or bins for lexical quantization is determined according to the number of color names used to characterize images. Additional details of lexical quantization are discussed in detail below and in the '597 application incorporated by reference above.

Once images are lexically quantized, words indicative of content of the images (e.g., lexical color names) are associated with the images. The words associated with the images may be used to facilitate management of the images, such as storage and retrieval of images, according to one embodiment. For example, a user may submit commands or requests identifying stored images to be retrieved in terms of the human readable lexicon and the image management system 10 may perform operations with respect to the images using the commands or requests and the lexical words associated with the images. In one embodiment described below, a user may submit a request for images via input 22 using search criteria including lexical words (e.g., "Locate images which are mostly red") and image management system 10 may search images stored in storage circuitry 16 using lexical words associated with the stored images, and rank the stored images according to how close they match the search criteria. In another exemplary embodiment, the user may present a photograph to scanning device 20 and the system 10 may rank stored images according to respective similarities to the scanned photograph. Other search criteria may be used in other embodiments.

Figure 2:
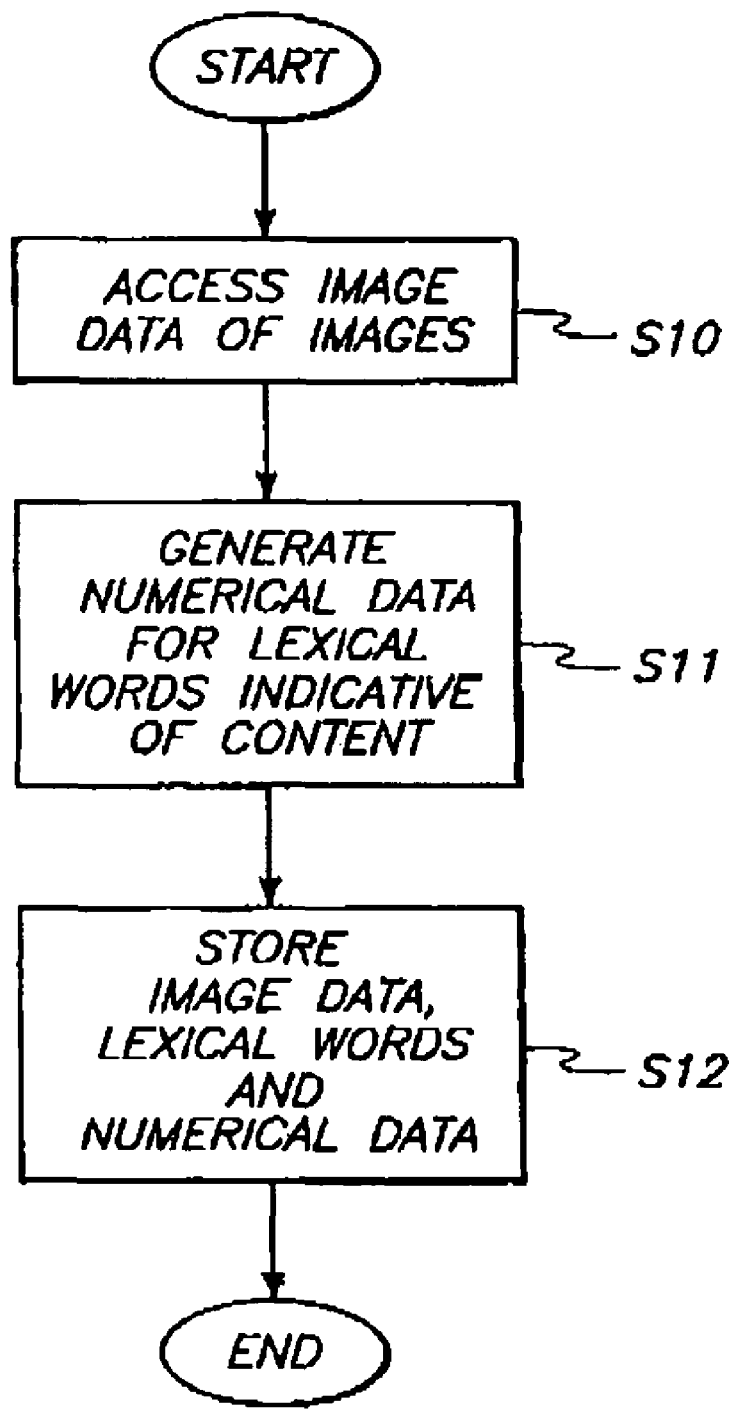
FIG. 2 is a flow chart of an exemplary method of processing and storing image data of a plurality of images according to one embodiment.

Referring to FIG. 2, an exemplary method which may be performed by processing circuitry 14 is shown. The method of FIG. 2 is an exemplary method for processing and storing images according to one embodiment. Other methods are possible including less, more, and/or alternative steps.

At a step S10, the processing circuitry may access image data (e.g., pixel-based RGB or CMYK data) of images to be stored using the image management system.

At a step S11, the processing circuitry processes the image data to characterize the contents of the images using lexical words of a desired human readable lexicon which describe characteristics (e.g., color) of the images. In one embodiment, the processing circuitry may perform lexical quantization during the processing of the image data at step S11. In one implementation, a vocabulary of a desired number of categories or bins of the quantization is accessed. In one implementation wherein lexical quantization is performed with respect to color of the images, the vocabulary may include lexical color names of the human readable lexicon. As mentioned above, the lexical color names are human comprehensible words in one embodiment which may be read by an individual who can directly ascertain the associated characteristics of the image content from the words.

The processing circuitry may associate one of the lexical color names with each of a plurality of image forming elements (e.g., pixels) of the images in the described embodiment. Additional details of the associating according to one possible arrangement are discussed in the '597 patent application incorporated by reference above and FIG. 3 hereof. Once the individual image forming elements of the image data are assigned a lexical word, the processing circuitry 14 may use the lexical words to generate numerical data indicative of the extent of respective characteristics corresponding to the lexical words (e.g., colors) present within the respective image. In one embodiment, the processing circuitry 14 may generate a representation, such as a vector or histogram, including a plurality of categories or bins and numerical data associated therewith and corresponding to the lexical words associated with the image. The numerical data may indicate the extent of the respective characteristics present in respective images (e.g., indicate numbers of image forming elements of a given image having characteristics of the associated lexical color names, such as colors) in one implementation. Exemplary formation of histograms having a number of bins corresponding to possible numerical values of pixels is discussed in a co-pending U.S. Patent Application having publication number 2005/0052665, having Ser. No. 10/658,987, entitled "Image Processing Utilizing Local Color Correction and Cumulative Histograms", naming Nathan M. Moroney as inventor and the teachings of which are incorporated herein by reference. In one embodiment, a histogram having lexical words for a desired number of colors may be used. Numerical data for different numbers of colors may be used in other embodiments. Also, numerical data may be any kind of quantifiable representation of color content of an image in the described embodiment and may be integers, percentages, ratios, decimals, etc. The numerical data may be normalized in one embodiment.

At a step S12, the image data may be stored using the storage circuitry 16 and the processing circuitry 14 may additionally store and associate the results of the processing of step S11 (e.g., representations) with the image data of the respective images. The stored representations may be stored in the form of a vector or histogram comprising numerical data in the form of plural values indicative of the contents of the image corresponding to respective ones of the characteristics (e.g., lexical color names) and which may be stored as metadata of the respective images in one embodiment.

Referring to FIG. 3, details of an exemplary method of lexical quantization of image data with respect to color is described according to one embodiment. The method of FIG. 3 may be performed by processing circuitry 14 in one implementation. The method of FIG. 3 may be performed during the processing of step S11 of FIG. 2 in one embodiment. Other methods are possible including more, less and/or alternative steps.

At a step S15, accessed image data of an image being processed may be converted from an initial format to another format to facilitate processing. In one example wherein an image is a 24 bit RGB pixel image, the processing circuitry may convert the RGB values for individual pixels to YCC values and thereafter to polar YCC values.

At a step S16, the processing circuitry compares, for each of the image forming elements, the image data converted at step S15 to image data of each of the lexical words of the vocabulary being used. For example, the processing circuitry 14 may use a nearest neighbor method or fuzzy logic method as discussed in the '597 patent application incorporated by reference above to compare the image data of respective image forming elements with mean color values for each of the lexical color names. In one example, a centroid of an individual image forming element is compared with centroids of each of the mean color values of the lexical words. Other methods may be used to compare the image forming elements with the lexical words in other implementations.

At a step S17 and responsive to the processing of step S16, the processing circuitry identifies the closest lexical words (e.g., lexical color names) for the respective image forming elements of the image.

At a step S18, each image forming element is assigned one lexical word identified in step S17 and which is closest to describing the characteristic (e.g., color) of the content of the image forming element in one embodiment.

At a step S19, the image data of the image forming elements may be modified in one embodiment. In one possible embodiment, RGB data of the individual image forming elements is converted to respective mean color values of the lexical words (e.g., mean RGB values) corresponding to respective ones of the image forming elements as determined at steps S17-S18.

Following the processing of FIG. 3, a vector or histogram of the image may be generated as described in step S11 of FIG. 2 and stored using storage circuitry 16 as described in step S12 of FIG. 2 in one embodiment. In one embodiment, the vector or histogram includes numerical data including a plurality of values. In one embodiment, individual ones of the values represent the extent of the respective characteristics being present in the respective image (e.g., values of the histogram may represent the number of pixels for respective ones of the lexical color names present in the respective image). The numerical data corresponding to the lexical words may be stored as metadata of the images and may be used to index the images as described below. In one embodiment, the numerical data is normalized as mentioned above to permit processing of images of different sizes.

Referring to FIG. 4, an exemplary method for locating and retrieving stored images is described according to one embodiment. The method of FIG. 4 may be performed by processing circuitry 14 in one implementation. Other methods are possible including more, less and/or alternative steps.

At a step S20, the processing circuitry 14 accesses search criteria used to identify a desired image to be retrieved.

At a step S22, the processing circuitry 14 identifies one or more lexical words indicative of contents of the search criteria. In one example, a user may input a search request as mentioned previously which includes lexical words identifying characteristics to be present in images of the search results. For example, possible search requests are "Locate images which are 70% blue" (e.g., attempting to identify outdoor photographs having substantial sky or ocean content) or "Locate images which have are a majority green" (e.g., attempting to locate images of forests or grass). The exemplary text search criteria identifies the desired characteristics of the images using the lexical words as well as numerical data indicative of the extents of the characteristics desired to be in the search results. In another example, the user may present search criteria in the form of a photograph either digitally via communications interface 12 or as a print to image input device 20 in illustrative examples (the image presented for searching may be referred to as a search image). The processing circuitry 14 may perform lexical quantization of the search image to identify the lexical words and the respective numerical data indicative of the extent of characteristics of the lexical words present in the search image.

At a step S24, the processing circuitry 14 provides numerical data corresponding to the lexical words of the search criteria and which may be used to locate images which match or are similar to the search criteria. The processing circuitry 14 may access the numerical data from search requests inputted by a user of from the lexical quantization of the search image in the above-described examples. Processing circuitry 14 may provide the search criteria into an artificial representation, also referred to as a search representation, which may be in the form of an histogram or vector including numerical data indicative of the desired extent of the respective characteristics of the lexical words to be present in located images in one embodiment. For example, if the search criteria specifies 70% blue, the processing circuitry 14 may provide a value corresponding to blue in a respective bin of the search histogram or vector indicative of images having 70% normalized blue content. If the user presents a photograph or other image to provide the search criteria (e.g., in an attempt to retrieve similar images from the storage circuitry), the processing circuitry 14 may analyze the photograph as discussed above to generate the search representation comprising the histogram or vector and comprising the numerical values indicative of the extent of respective characteristics (lexical color names) present in the presented photograph.

At a step S26, the processing circuitry 14 compares numerical data of the search criteria to respective numerical data of individual ones of the stored images and indicative of the characteristics corresponding to the lexical words of the associated images. In one embodiment using representations in the form of lexical histograms, processing circuitry may determine the intersections of the search criteria histogram and respective individual ones of the lexical histograms of the stored images being compared. In one implementation, processing circuitry 14 may use an exemplary metric of Euclidean distance measurements to compare numerical data of the search criteria with respect to numerical data of respective ones of the stored images. An exemplary equation to compare numerical data of the search criteria to numerical data of a respective one of the images is provided by:

$$\text{EuclideanDistance} = \sqrt{(x_1-y_1)^2 + \ldots (X_n-Y_n)^2} \qquad \text{Eqn. 1}$$

where x1, x2 . . . xn are values of the search criteria corresponding to respective lexical words and y1, y2 . . . yn are values of the stored image corresponding to the respective lexical words. The results of processing of Eqn. 1 yields the distances of the search criteria with respect to the numerical data of each of the images.

At a step S28, the processing circuitry may rank the stored images with respect to the search criteria based on similarities to the search criteria (e.g., from most similar (or close) to the search criteria to the most dissimilar (or farthest) from the search criteria).

At a step S30, the processing circuitry may identify one of the images as being the closest to the search criteria, the closest (n) number of images to the search criteria (e.g., n=ten images) or in accordance with the results desired by the user.

At a step S32, the processing circuitry may access the one or more images identified in step S30 and display the results to the user using display 24. In other embodiments, the processing circuitry may also utilize other features (e.g., texture, faces, time/date, etc.) for management of images.

At least some aspects of the disclosure describe lexical color naming representations (e.g., histograms or vectors) for indexing and retrieval of photographs or video image content. According to at least one embodiment, indexing and retrieval of images is enhanced by relative insensitivity of system 10 to changes in illumination (shadows, actual illuminant). More specifically, color changes of an object of a single color may fall into numerous uniform color quantization bins (i.e., due to a change in illumination due to curvatures of 3D objects, changes in illuminant estimation or other capture parameters of a digital camera from picture to picture, etc.) when uniform quantization of a color space is used. However, these color changes remain within a single lexical quantization bin by taking into account human color perception and human given color names according to some embodiments. Erroneous indexing or retrieval results may be reduced with respect to processing of data content having changes in illumination and/or capture parameters illustrating increased robustness of image indexing and retrieval based on color similarity in at least one embodiment of the disclosure.

The protection sought is not to be limited to the disclosed embodiments, which are given by way of example only, but instead is to be limited only by the scope of the appended claims.

What is claimed is:

1. An image management method comprising:
   storing a plurality of images using storage circuitry;
   for each image:
      processing the image, by a processor, on a pixel-by-pixel basis to determine a color of each of a plurality of pixels of the image, resulting in a plurality of colors of the image, where each color of the image is the color of at least one pixel of the image;
      associating, by the processor, for each pixel, the color of each pixel a human comprehensible lexical color name descriptive of the color of the pixel; and,
      for each color of the image, determining, by the processor, an extent to which the color is present within the image based on a number of pixels of the image that have the color;
   storing, by the processor, a plurality of representations for respective ones of the images, and wherein the representations individually comprise data corresponding to a plurality of human comprehensible words of a human readable lexicon and descriptive of respective characteristics of content of the respective image,
   wherein, for each image, the words are descriptive of each color present within the image,
   wherein, for each image, the representation further includes numeric data for each color present within the image indicating the extent to which the color is present within the image;
associating respective ones of the representations with respective ones of the images, by the processor;
accessing search criteria, by the processor;
comparing the search criteria with the representations, by the processor;
identifying a selected one of the images responsive to the comparing, by the processor; and
accessing the selected one of the images from the storage circuitry after the identifying, by the processor.

2. The method of claim 1 wherein the search criteria comprises at least one of the words of the human readable lexicon and numerical data indicative of a desired extent of the respective characteristic which corresponds to the at least one of the words to be present in the selected one of the images.

3. The method of claim 2 further comprising quantifying the extents of the respective characteristics present in the images and providing numerical data indicative of the extents of the respective characteristics, and wherein the comparing comprises comparing the numerical data of the respective characteristic of the search criteria with the numerical data of the respective characteristic of the images.

4. The method of claim 1 wherein the search criteria comprises a histogram comprising a plurality of numerical values corresponding to respective ones of the characteristics.

5. The method of claim 1 wherein the accessing the search criteria comprises:
   providing a search image; and
   using the search image, providing numerical data of the search criteria which is indicative of the extent of a respective characteristic present in the search image.

6. The method of claim 1 further comprising ranking the images based on similarities of the images to the search criteria responsive to the comparing.

7. The method of claim 6 wherein the identifying comprises identifying the selected one of the images being the most similar to the search criteria.

8. An image management system comprising:
   storage circuitry configured to store a plurality of images and to store a plurality of representations corresponding to human comprehensible words of a human readable lexicon and associated with respective ones of the images, wherein the words are descriptive of characteristics of content of the images and the respective representations are indicative of the extents of the respective characteristics present in respective ones of the images; and
   processing circuitry coupled with the storage circuitry and configured to identify one of the images from an other of the images using the representations associated with the one and the other of the images,
   wherein, for each image, the words are described of each color present within the image,
   wherein, for each image, the representation further includes numeric data for each color present within the image indicating an extent to which the color is present within the image,
   and wherein the processing circuitry is further to, for each image:
      process the image on a pixel-by-pixel basis to determine a color of each of a plurality of pixels of the image, resulting in a plurality of colors of the image, where each color of the image is the color of at least one pixel of the image;
      associate, for each pixel, the color of each pixel a human comprehensible lexical color name descriptive of the color of the pixel; and,
      for each color of the image, determine the extent to which the color is present within the image based on a number of pixels of the image that have the color.

9. The system of claim 8 wherein the processing circuitry is configured to access search criteria and to use the search criteria to identify the one of the images.

10. The system of claim 9 wherein the processing circuitry is configured to generate the search criteria comprising numerical data for respective ones of the characteristics using a search image.

11. The system of claim 9 wherein the search criteria comprises at least one of the words of the human readable lexicon, and numerical data indicative of a desired extent of the respective characteristic which corresponds to the word to be present in the selected one of the images.

12. The system of claim 9 wherein the characteristics are colors, wherein the storage circuitry is configured to store the representations comprising a plurality of histograms, and wherein the histograms comprise numerical data indicating the extents of the colors in the respective images, and wherein the search criteria is in the form of a histogram comprising the numerical data indicative of the desired extent of the at least one of the colors to be present in the identified one of the images, and wherein the processing circuitry is configured to compare the histogram of the search criteria with respect to individual ones of the histograms of the images to identify the one of the images.

13. A computer-readable data storage medium having a computer program stored thereon, wherein execution of the computer program by a processor causes a method to be performed, the method comprising:
   accessing search criteria usable to identify an image having at least one desired color;
   searching numerical data of a plurality of stored images using the search criteria, wherein the numerical data for one of the stored images comprises a plurality of values for a plurality of colors corresponding to a plurality of lexical color names of a human readable lexicon, and wherein the values are indicative of quantities of the respective colors present in the respective one of the stored images;
   responsive to the searching, selecting at least one of the stored images having the at least one desired color;
   processing the image on a pixel-by-pixel basis to determine a color of each of a plurality of pixels of the image, resulting in a plurality of colors of the image, where each color of the image is the color of at least one pixel of the image;
   associating, for each pixel, the color of each pixel a human comprehensible lexical color name descriptive of the color of the pixel; and for each color of the image, determining an extent to which the color is present within the image based on a number of pixels of the image that have the color.

14. The computer-readable data storage medium of claim 13 wherein the accessing search criteria comprises accessing text input of a user and comprising at least one of the lexical color names and numerical data indicative of a desired extent of the color corresponding to the at least one lexical color name to be present in the selected image.

15. The computer-readable data storage medium of claim 13 wherein the accessing search criteria comprises:

accessing image data regarding at least one color of a search image and corresponding to one of the lexical color names to be present in the selected image; and using the accessed image data, providing numerical data of the search criteria and indicative of a desired extent of the at least one color, and wherein the searching the numerical data of the plurality of stored images comprises searching using the numerical data of the search criteria.

* * * * *